US011945543B2

(12) United States Patent
Ortmann et al.

(10) Patent No.: US 11,945,543 B2
(45) Date of Patent: Apr. 2, 2024

(54) BRAKE UNIT FOR A VEHICLE WHEEL MODULE COMPRISING THE BRAKE UNIT, AND VEHICLE COMPRISING THE BRAKE UNIT AND/OR THE WHEEL MODULE

(71) Applicant: Schaeffler Technologies AG & Co. KG, Herzogenaurach (DE)

(72) Inventors: Simon Ortmann, Baden-Baden (DE); Philippe Wagner, Souffelweyersheim (FR); Doris Maria Wimmer, Ottenhöfen (DE); Alan Barrera, Karlsruhe (DE); Aurelien Grauss, Mommenheim (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 105 days.

(21) Appl. No.: 17/624,384

(22) PCT Filed: May 28, 2020

(86) PCT No.: PCT/DE2020/100452
§ 371 (c)(1),
(2) Date: Jan. 3, 2022

(87) PCT Pub. No.: WO2021/000985
PCT Pub. Date: Jan. 7, 2021

(65) Prior Publication Data
US 2022/0355895 A1 Nov. 10, 2022

(30) Foreign Application Priority Data
Jul. 13, 2019 (DE) .......................... 102019117961.0

(51) Int. Cl.
*B62L 1/00* (2006.01)
*B62K 3/00* (2006.01)
(Continued)

(52) U.S. Cl.
CPC .............. *B62L 1/005* (2013.01); *B62K 3/002* (2013.01); *B62L 1/02* (2013.01); *B62K 2202/00* (2013.01); *B62L 3/023* (2013.01)

(58) Field of Classification Search
CPC ........ F16D 55/02; F16D 55/32; F16D 65/186; F16D 65/847; F16D 2055/055;
(Continued)

(56) References Cited

U.S. PATENT DOCUMENTS

| 2,417,854 A | * | 3/1947 | Barish | F16D 55/32 188/72.3 |
| 2,535,763 A | * | 12/1950 | Tucker | F16D 55/32 188/72.4 |
| 2,581,941 A | * | 1/1952 | Shinn | F16D 55/32 188/251 A |

(Continued)

FOREIGN PATENT DOCUMENTS

| CN | 1425110 A | 6/2003 |
| CN | 102149938 A | 8/2011 |

(Continued)

*Primary Examiner* — Robert A. Siconolfi
*Assistant Examiner* — San M Aung
(74) *Attorney, Agent, or Firm* — Volpe Koenig

(57) ABSTRACT

In human-powered vehicles, e.g., bicycles, etc., it is customary to use drum brakes, disc brakes or shoe brakes. Each of the braking systems has different advantages in terms of braking effect, system costs, ease of maintenance, etc. A brake unit with a modified structure for a vehicle is provided. For this purpose, a brake unit 14 for a vehicle 1 is disclosed, having a housing 15, having a brake body device 23, wherein the brake body device 23 supports a stationary brake partner of a brake apparatus 12 for the vehicle 1, wherein the housing 15 and/or the brake body device 23 defines a main axis H, having an actuator for moving the brake body device relative to the housing 15 in order to generate a braking force, wherein the stationary brake partner is formed as a brake disc 13.

19 Claims, 5 Drawing Sheets

(51) Int. Cl.
*B62L 1/02* (2006.01)
*B62L 3/02* (2006.01)

(58) Field of Classification Search
CPC ......... F16D 2055/0058; F16D 2121/04; F16D 55/28; F16D 55/34; F16D 2127/02; F16D 65/0087; B60T 11/16
USPC .......................................................... 188/26
See application file for complete search history.

(56) References Cited

U.S. PATENT DOCUMENTS

| | | | | |
|---|---|---|---|---|
| 2,808,129 | A * | 10/1957 | Kraus | F16D 55/06 188/218 XL |
| 3,971,457 | A * | 7/1976 | Campagnolo | F16D 65/54 188/26 |
| 3,982,610 | A * | 9/1976 | Campagnolo | F16D 55/02 188/26 |
| 2002/0043777 | A1* | 4/2002 | Ireton | A63C 17/1427 280/87.041 |
| 2004/0118643 | A1* | 6/2004 | Booher | F16D 55/22 188/73.1 |
| 2013/0062928 | A1* | 3/2013 | Crawford | F16D 55/24 301/105.1 |
| 2016/0059108 | A1 | 3/2016 | Demolder | |
| 2020/0049216 | A1* | 2/2020 | Herrmann | F16D 55/36 |

FOREIGN PATENT DOCUMENTS

| | | |
|---|---|---|
| CN | 102207142 A | 10/2011 |
| CN | 105874234 A | 8/2016 |
| DE | 20016878 | 5/2001 |
| EP | 0291430 | 5/1988 |
| WO | 2020098859 | 5/2020 |

* cited by examiner

BRAKE UNIT FOR A VEHICLE WHEEL MODULE COMPRISING THE BRAKE UNIT, AND VEHICLE COMPRISING THE BRAKE UNIT AND/OR THE WHEEL MODULE

CROSS-REFERENCE TO RELATED APPLICATIONS

This application is the U.S. National Phase of PCT Appln. No. PCT/DE2020/100452, filed May 28, 2020, which claims priority from German Patent Application No. 10 2019 117 961.0, filed Jul. 3, 2019, the entire disclosures of which are incorporated by reference herein.

TECHNICAL FIELD

The disclosure relates to a brake unit for a vehicle. The disclosure further relates to a wheel module having the brake unit, and to the vehicle having the brake unit and/or having the wheel module.

BACKGROUND

In human-powered vehicles, e.g., bicycles, etc., it is customary to use drum brakes, disc brakes or shoe brakes. Each of the braking systems has different advantages in terms of braking effect, system costs, ease of maintenance, etc.

For example, publication DE 200 16 878 U1 describes a push scooter with a brake apparatus formed as a hydraulically activated disc brake. The brake apparatus comprises a brake disc connected to a wheel in a non-rotatable manner and a brake caliper fixed to the frame of the pedal scooter, wherein the brake caliper contains brake pads acting on the brake disc.

SUMMARY

It is the object of the present disclosure to propose a brake unit with a modified structure for a vehicle. This object is achieved by a brake unit with one or more of the features disclosed herein, by a wheel module with one or more of the features disclosed herein, and by a vehicle with one or more of the features disclosed herein. Preferred or advantageous embodiments result from the claims, the following description, and the attached figures.

The disclosure relates to a brake unit which is suitable and/or formed for a vehicle. In particular, the vehicle is formed as a single or multi-track vehicle. Preferably, the vehicle is formed as an electrically powered vehicle. For example, the vehicle is a small electric vehicle, wherein "small electric vehicle" means vehicles without a seat or self-balancing vehicles with or without a seat.

Preferably, the vehicle is formed as a small or micro vehicle or as an electric vehicle. The vehicle preferably has at least one wheel. With only one wheel, the vehicle can be formed as an electric unicycle, for example as a so-called monowheel or solowheel. With two or more wheels, the vehicle is preferably formed as a scooter, in particular an electric motorcycle, an electric motor scooter, an electric scooter, electric pedal scooter, e-scooter, a segway, hoverboard, kickboard, skateboard, longboard or the like. Alternatively, the vehicle can be formed as a bicycle, in particular as an electric bicycle, for example as a pedelec or as an e-bike. The vehicle can alternatively be formed as a multi-track bicycle, in particular with three or more wheels. For example, the vehicle may be a transport or cargo bike, in particular a motorized or electrically powered transport or cargo bike, more specifically a three-wheeled or four-wheeled pedelec or a rickshaw, in particular with or without a roof, or a cabin scooter.

The vehicle can include one or more of the brake units. The brake unit has a housing, wherein the housing is arranged and/or is arrangeable on the vehicle in a stationary and/or non-rotatable manner. Preferably, the housing is arranged coaxially with a stationary or rotating wheel axle of the vehicle. In particular, the wheel axle penetrates the housing. For this purpose, the housing has, for example, a through opening for receiving the wheel axle.

The brake unit has a brake body device, wherein the brake body device supports a stationary brake partner of a brake apparatus for the vehicle. In particular, the brake body device forms the stationary brake partner in the housing, wherein a rotating brake partner is connected to a wheel of the vehicle in a non-rotatable manner.

The brake unit has a main axis, wherein the main axis is understood as a constructive and/or imaginary auxiliary axis. The main axis can be defined, for example, by the housing, in particular by the through opening or the wheel axle. Alternatively or additionally, the main axis can be defined by the brake body device.

The brake unit has an actuator for moving, in particular actuating, the brake body device. In particular, the braking force is transmitted from the brake body device, in particular from the stationary brake partner, to the rotating brake partner. In the most general form of the disclosure, the actuator can be actuated hydraulically, pneumatically, by an electric motor, or mechanically.

In the context of the disclosure, it is proposed that the stationary brake partner be formed as a brake disc. In particular, the brake disc runs around the main axis completely and/or by 360°. The brake disc can be implemented geometrically as a disc or annular disc, alternatively it can be formed as a section from a larger component and thus form a brake disc section in this component.

It is a consideration of the disclosure that by using a stationary brake disc, the overall structure of the brake apparatus can be redesigned and the properties of the brake apparatus can be changed. It is thus possible to place the brake disc axially further outwards and nevertheless to arrange the actuator on the stationary part of the brake apparatus so that the number and/or the weight of the rotating parts are kept low. The arrangement of the brake unit and thus the brake disc on an axial outer side of the bicycle wheel also changes the temperature management of the brake device, as the brake disc is known to heat up during heavy braking. Because the brake disc is axially outer side, the heat can be better dissipated and the brake disc can be cooled better.

In a preferred embodiment, the brake disc is formed from metal or ceramic. In particular, the stationary brake partner is formed as the hard brake partner, whereas the rotating brake partner is implemented as the soft brake partner. Due to the high thermal conductivity of the metal in particular, the heat that arises as a result of heavy braking is evenly distributed and/or dissipated on or in the brake disc.

The brake disc provides a braking surface, wherein the braking surface is preferably formed as an annular surface, in particular a circular annular surface, for introducing the braking force. In particular, the braking surface is formed by a material surface of the brake body device. For example, the braking surface can be formed by a treated surface of the brake disc, for example by grinding and/or honing the surface, in order, for example, to reduce the roughness of the braking surface.

The braking surface is preferably formed in the radial direction with respect to the wheel axle on the brake disc and/or extends in a radial plane to the main axis. The braking surface is preferably formed exclusively on one side of the brake disc. In particular, the braking surface is arranged on an axially inner side of the brake unit. Alternatively or additionally, the braking surface is formed to be circumferential, in particular uninterrupted or largely uninterrupted, to the main axis. As is common with brake discs, the braking surface of all alternatives may be perforated by ventilation holes, mounting holes or the like. The alternatives mentioned reflect the fact that the brake disc is not limited to one segment with regard to the braking surface, but extends over 360° around the main axis. The surface for introducing braking energy is thus formed to be comparatively large so that the heat resulting from braking processes remains comparatively low.

In a preferred development of the disclosure it is provided that the actuator moves the brake body device relative to the housing in the axial direction to the main axis. The brake disc is thus advanced in the axial direction in order to generate the braking force.

In a preferred structural embodiment, the actuator is formed as a hydraulic device. The hydraulic device is thus formed for the hydraulic activation of the brake apparatus. For example, the hydraulic device can be actuated by a brake lever of the vehicle and activate the brake apparatus so that a rotating wheel can be braked. For example, a cylinder of the hydraulic unit can be operatively connected to the housing and a piston of the hydraulic unit can be operatively connected to the brake body device. Particularly preferably, the cylinders are connected to the housing and the piston is connected to the brake body device in a fixed or form-fitting manner. Particularly preferably, the hydraulic unit may have an annular space and an annular piston, wherein the annular piston is arranged in the annular space. A hydraulic fluid for actuating the annular piston is arranged in the annular space. The annular space and the annular piston are formed circumferentially to the main axis.

The brake unit preferably has a guide unit which, when the brake body device moves axially relative to the housing, guides the brake body device in the radial direction, in particular to the main axis. This, for example, prevents tilting between the brake body device and the housing.

It is optionally proposed that the guide unit has a master guide and an auxiliary guide. Thus, the guide unit has at least or exactly two guides. It is provided that the master guide and the auxiliary guide are arranged eccentrically to the main axis. In particular, they are not placed coaxially, but offset from the main axis.

Here, it is a consideration of the development that when the braking force is transmitted from the stationary brake partner to the rotating brake partner in the stationary brake partner, torques about the main axis are introduced into the brake body device in addition to axial forces, in particular in addition to braking forces or corresponding counterforces. In order to avoid tilting or twisting of the brake body device relative to the housing, it is proposed to equip the guide unit with at least or exactly two separate individual guides.

In a preferred constructive embodiment, the master guide has a first radial clearance and the auxiliary guide has a second radial clearance. The radial clearance can be measured locally in the master guide and in the auxiliary guide. If the master guide and/or the auxiliary guide are formed to be rotationally symmetrical, the radial clearance can be measured locally in every direction with respect to the master guide or to the auxiliary guide. Alternatively or additionally, the radial clearance can be measured in the direction of rotation around the main axis. Thus, the torque in the direction of rotation is absorbed primarily by the master guide and secondarily by the auxiliary guide. This results in the torque being safely diverted. On the other hand, the different radial clearance ensures that there is no over-definition of the brake unit in the direction of rotation about the main axis, thus preventing jamming of the brake body device even at different temperatures etc.

In a preferred constructive embodiment, the master guide has a first axle section, which is arranged on the brake body device and, in particular, forms a component of the brake body device. Furthermore, the master guide has a first guide section which is arranged on the housing and, in particular, forms a component of the housing. The first axle section is arranged coaxially in the first guide section and is guided by it. Alternatively or additionally, the auxiliary guide has a second axle section which is arranged on the brake body device and, in particular, forms a component of the brake body device. Furthermore, the auxiliary guide has a second guide section which is arranged on the housing and, in particular, forms a component of the housing. The second axle section is arranged coaxially in the second guide section and is guided by it. The second radial clearance is measured between the second axle section and the second guide section, preferably in the direction of rotation about the main axis or alternatively about its own central axis. Preferably, the axle sections and/or the guide section in the guide area are formed to be rotationally symmetrical.

It can be provided that the axle sections each have a guide surface, thus a first and a second guide surface, for contact with the guide sections. This configuration has the advantage that very few components or parts are used. On the other hand, the axle sections or the guide sections must be formed of a corresponding material suitable for the function. Alternatively, it is particularly preferred that a first guide sleeve is placed on the first axle section, which provides the first guide surface. Alternatively or additionally, the second axle section has a second guide sleeve, which provides the second guide surface. In particular, the first and/or the second guide sleeve is formed as a straight hollow cylinder. The use of a guide sleeve can provide a hard and thus low-wear guide surface, but the axle sections of the brake body device can be formed from any material.

The first radial clearance is measured between the first guide surface, in particular the first axle section or (if present) the first guide sleeve, and the first guide section, preferably in the direction of rotation about the main axis or alternatively about its own central axis. The second radial clearance is measured between the second guide surface, in particular the second axle section or (if present) the second guide sleeve, and the second guide section, preferably in the direction of rotation about the main axis or alternatively about its own central axis.

In a preferred further embodiment, the housing has a housing base body. The housing base body can be manufactured, for example, by aluminum die-casting. It is particularly preferred that the first and/or the second guide section is integrally formed by the housing base body. This means that the guide sections are formed by a section of die-cast aluminum and can thus be manufactured at low cost. Alternatively or additionally, the brake body device has a brake base body. The brake base body can be manufactured, for example, by aluminum die-casting. It is particularly preferred that the first and/or the second axle section is integrally formed by the brake base body. This means that the axle sections are formed by a section of die-cast aluminum and can thus be manufactured at low cost.

In one possible constructive embodiment, the brake body device has a force distribution plate. The force distribution plate is implemented in particular as a sheet metal plate made of metal. The force distribution plate is operatively connected to the hydraulic unit. Particularly preferably, the force distribution plate has a contact surface for the annular piston or for an adapter piece which is supported against the annular piston. The force distribution plate is connected to the brake body device via the first, the second and also via at least or exactly one third axle section. Preferably, the force distribution plate is connected to the brake base body via the at least or exactly three axle sections.

In a preferred constructive embodiment, it can be provided that the three axle sections are regularly distributed in the direction of rotation in order to introduce the braking force as uniformly as possible into the brake body device. The third axle section is guided in the radial direction and/or in the direction of rotation with an even greater radial clearance than the first and/or second radial clearance or not at all.

In a preferred further embodiment, the brake unit has a return unit for returning the brake body device. The return unit has a first return spring, a second return spring and a third return spring. The first return spring is assigned to the master guide, the second return spring to the auxiliary guide, and the third return spring to the third axle section. In this way, the return force is also introduced evenly after the braking process. On one side, the return springs and/or the return unit are supported on the housing and, on the other side, preferably on the brake base body.

A further object of the disclosure relates to a wheel module for a vehicle or the vehicle, wherein the wheel module has a brake unit as described above. The vehicle can include one or more of the wheel modules. The wheel module has a wheel. In particular, the wheel is a front or rear wheel of the vehicle. The wheel comprises a wheel rim and preferably a tire, wherein the tire is arranged on the wheel rim. Particularly preferably, the tire is an air-filled and/or inflatable rubber tire.

It is provided that the wheel module has a rotating brake partner of the brake apparatus, wherein the rotating brake partner is non-rotatably connected to the wheel and/or the wheel rim. The rotating brake partner is particularly preferably formed as a brake pad or comprises this. In particular, when the brake apparatus is actuated, the brake pad and the brake disc are moved relative to each other in the axial direction and brought into frictional and/or force-fitting contact with each other so that a braking torque is transmitted to the wheel. Preferably, the brake disc forms a metallic partner and the brake pad a friction partner. Specifically, the brake disc and brake pad are matched to one another in such a way that the brake pad is subject to greater wear.

In particular, the brake pad is arranged on an axial end face of the wheel rim. Preferably, the brake pad is applied directly or indirectly to the wheel rim. In particular, the brake pad covers an outer surface of the wheel rim at least in sections. In principle, the brake pad can be interrupted in the direction of rotation or arranged in several sections on the wheel rim. Particularly preferably, however, the brake pad is formed to be continuous around the circumference.

One advantage of the development is that by arranging the brake pad on the rim, the brake apparatus can be arranged on the wheel in a particularly space-saving manner. The arrangement of the brake pad on the wheel rim also allows the brake apparatus to be adapted in a simple manner to a size of the wheel, in particular to a size of the wheel rim. In particular, the brake apparatus, unlike ordinary brake shoes of a disc brake, builds up only slightly towards the outer side, so that any risk of protruding components, which can also heat up, is significantly reduced.

In a preferred embodiment it is provided that the brake pad remains axially stationary on the wheel rim. In particular, the brake disc is arranged in a non-rotatable manner in the direction of rotation and displaceable in an axial direction relative to the wheel axle. Particularly preferably, the brake pad rotates about the axis of rotation when the vehicle is in driving operation, wherein the brake disc remains stationary in the direction of rotation. When the brake apparatus is actuated, the brake disc is subjected to a braking force to generate the braking torque and is thus pressed against the brake pad in an axial direction.

It is thus a consideration of the development that due to the axial displacement of the brake disc, only one brake pad is required on the wheel side. Thus, a compact and component-reduced brake apparatus is proposed. In addition, a simple connection to the wheel rim is made possible, especially for small tire diameters.

In another preferred embodiment, the brake pad is formed to be annular in shape and is arranged coaxially and/or concentrically with the wheel rim with respect to the wheel axle. In particular, the brake pad defines an annular surface encircling the axis of rotation, which is arranged coaxially and/or concentrically to the brake disc and/or the wheel rim and/or the wheel axle. Particularly preferably, the brake disc makes flat contact with the annular surface in the actuated state of the brake apparatus. It is a consideration of the development to propose a brake apparatus which is characterized by improved braking performance. The annular design of the brake pad increases the contact surface with the brake disc.

In a further preferred implementation, the brake pad forms a thermal insulator so that thermal insulation in the direction of the wheel rim is implemented by the brake pad. In particular, the brake pad reduces heat transfer from the brake apparatus, in particular during a braking process, to the wheel. Preferably, the brake pad is formed from a thermally insulating material. Particularly preferably, the material of the brake pad has a coefficient of thermal conductivity that is significantly smaller than a coefficient of thermal conductivity of the material of the wheel rim. For example, the material of the brake pad has a thermal conductivity coefficient of less than 10 W/(m*K), preferably less than 1 W/(m*K), more specifically less than 0.5 W/(m*K).

Advantageously, the brake pad can significantly reduce heat transfer from the brake pad to the wheel rim, caused by heat generated in particular during braking of the rotating wheel. In particular, damage to the wheel rim and/or components integrated in the wheel, such as bearing devices, wheel drive, etc., can thus be avoided.

It is particularly preferred that the brake pad has a friction means of the "organic" category. In particular, the friction means is made of an organic material. Particularly preferably, the friction means comprises fibers of glass and/or rubber and/or carbon and/or aramid, in particular para-aramid, which are embedded in particular in a resin matrix. Preferably, the resin matrix is formed by a temperature-resistant synthetic or natural resin.

A brake pad is thus proposed which is characterized by a high coefficient of friction and, at the same time, a low coefficient of thermal conductivity or heat transfer.

In a first specification it is provided that the brake pad is applied directly to the wheel rim. In particular, the brake pad is integrated into the wheel rim or applied to the wheel rim, preferably as a coating. Alternatively or optionally in addition, the brake pad is connected to the wheel rim by a material bond. In particular, the brake pad may be bonded to the rim. For example, an adhesive can be used for this purpose which also has thermally insulating properties and/or is mixed with a thermally insulating additive. It is thus a consideration of the development to propose a brake pad which is characterized by a particularly small axial installation width.

In an alternative specification, it is provided that the brake apparatus has an annular brake pad carrier, which in particular carries the brake pad. The brake pad is fastened and/or can be fastened to the wheel rim via the brake pad carrier, preferably in a force-fitting and/or form-fitting and/or materially bonded manner. Particularly preferably, the brake pad carrier is detachably fastened to the wheel rim, in particular by means of a screw connection. Specifically, the brake pad carrier is attached to the wheel rim by one or more fastening means, such as bolts, rivets, or the like. For example, the brake pad carrier can be made of a material that also has thermal insulating properties and is heat-resistant at the same time. Particularly preferably, the brake pad carrier is arranged coaxially and/or concentrically to the wheel rim and/or the wheel axle. It is a consideration of the development to propose a brake pad which is particularly easy to install on the wheel rim and to remove again. In addition, the suitable choice of brake pad carrier can additionally favor thermal insulation with respect to the wheel rim.

In a further preferred embodiment, it is provided that the wheel module has a drive device, in particular an electrically operated drive device, in particular an electric motor, which is formed and/or suitable for driving the wheel. In particular, the drive device is an electrical machine. The drive unit is arranged radially inside the wheel rim or integrated into it. The drive device has a stator that is connected to the wheel axle in a non-rotatable manner and a rotor that is connected to the wheel rim in a non-rotatable manner. In a driving mode, a driving torque is generated by the drive device, which acts on the rotor and thus the wheel, so that the wheel is driven around the axis of rotation. In particular, the brake pad, which is formed as a thermal insulator, protects the drive device from overheating, which can significantly increase the operational reliability and service life of the drive device.

The rotating brake partner and the drive device are preferably arranged adjacent, in particular directly adjacent to one another. In particular, these have an axial distance or gap of less than 3 cm, in particular less than 2 cm and particularly less than 1 cm. As a result, the wheel module can be constructed in a particularly compact manner.

The brake body device or a base body of the brake body device, which carries the stationary brake partner, is preferably made of a solid material, for example metal, in particular aluminum. The brake body device preferably has a cooling structure on one side on a radially formed circular surface. The cooling structure is preferably formed as one or more cooling ribs for exchanging thermal energy of the brake body device with an environment, for example ambient air. The cooling fins are preferably incorporated into the solid material of the brake body device. For example, the cooling fins are milled into the one radial circular surface of the brake body device or during the primary molding. The stationary brake partner and the base body are preferably in thermal contact. In particular, these lie flat against one another in a radial plane in a thermal contact surface. The thermal contact surface is also preferably an annular surface. The thermal contact surface particularly preferably has not less than 50% of the braking surface, the same surface as the braking surface or a larger surface.

Thermal transport in the direction of the drive device is thus prevented by the brake pad. In contrast, the brake disc promotes thermal transport into the base body of the brake body device, wherein the heat can be dissipated through the cooling structure.

The wheel module preferably forms an interior, wherein the two brake partners are arranged in the interior. In particular, the interior is delimited on the one axial side by the housing and/or the brake body device and on the other axial side by the stationary brake partner and/or the wheel rim and/or the drive device. Radially on the outer side, it is preferred that the interior is delimited by the wheel rim. In particular, only an annular gap remains between the brake body device and the wheel rim, wherein the annular gap extends in the axial direction so that the brake body device can be moved relative to the wheel rim. The wheel module is particularly preferably formed as an encapsulated wheel module, wherein the encapsulation is implemented by the interaction of the brake body device and the wheel rim.

A further object of the disclosure relates to a vehicle having the wheel module as previously described. It is particularly provided that the vehicle is an electric motorcycle or an electric scooter. In particular, the vehicle has exactly one wheel module, wherein the wheel module optionally serves as a front or rear wheel of the vehicle. Preferably, the wheel module is fixed to the wheel fork or frame via the wheel axle. In particular, the wheel fork can be connected to a handlebar of the vehicle so that the wheel module and thus the vehicle can be steered.

BRIEF DESCRIPTION OF THE DRAWINGS

Further features, advantages and effects of the disclosure are set out in the following description of the preferred embodiments. In the figures.

DETAILED DESCRIPTION

Parts that correspond to each other or are identical are marked with the same reference marks in the figures.

Figure 1:
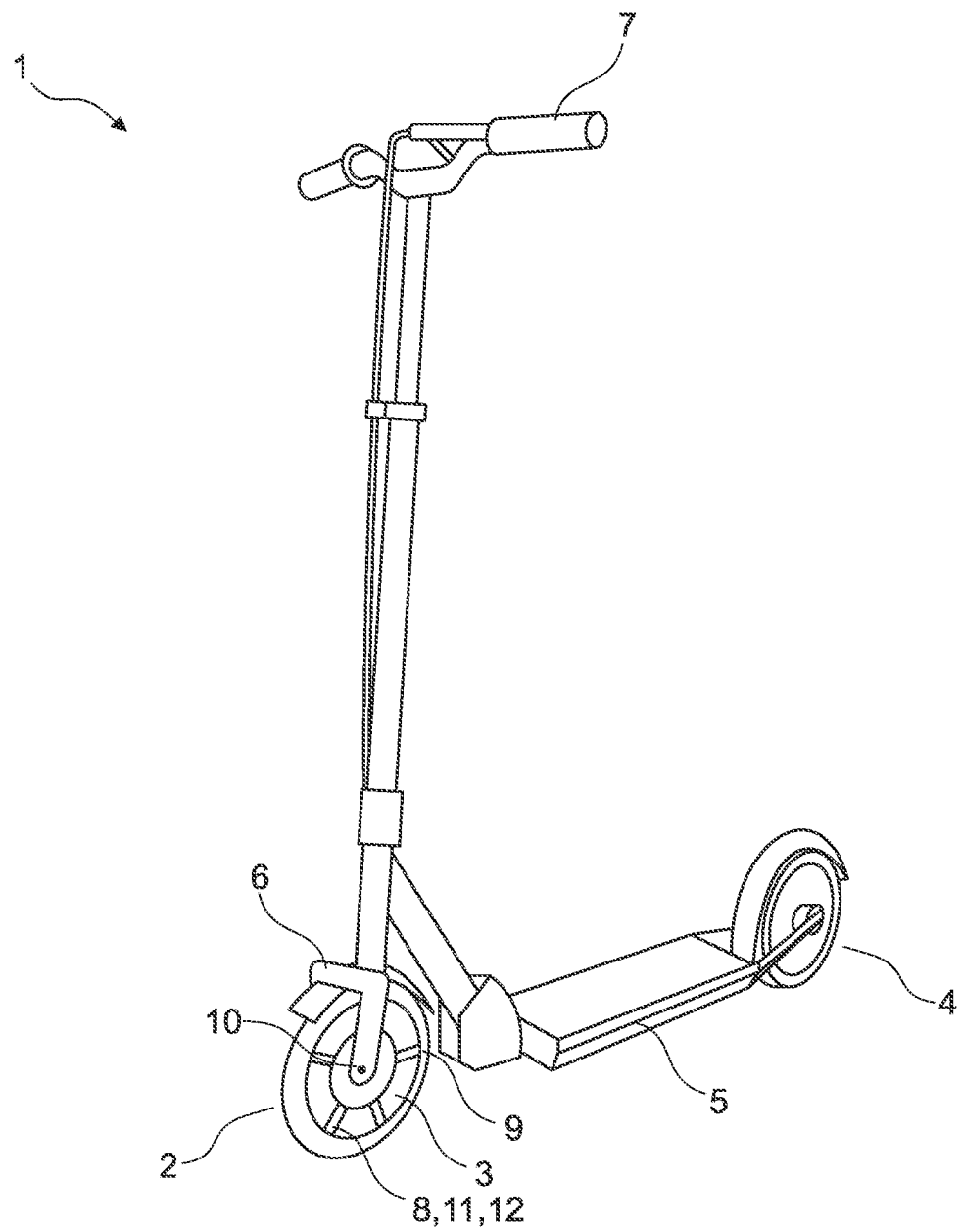
FIG. 1 shows a three-dimensional representation of a vehicle with a brake unit as an exemplary embodiment.

FIG. 1 shows a three-dimensional representation of a vehicle 1, wherein the vehicle 1 is formed as an electric motorcycle, electric pedal scooter or electric scooter, also known as an e-scooter. For this purpose, the vehicle 1 has a wheel module 2 with a wheel 3, which forms a front wheel of the vehicle 1. The wheel module 2 is used in particular to electrically drive the vehicle 1. In addition, the vehicle 1 has a rear wheel 4, in particular a non-powered rear wheel, which is rotatably mounted on a vehicle frame 5 of the vehicle 1.

The vehicle 1 has a wheel fork 6, wherein the wheel module 2 is rotatably mounted in the wheel fork 6. The wheel fork 6 is pivotally connected to the frame 5 via handlebars 7, so that the wheel module 2 can be pivoted via the handlebars 7 to steer the vehicle 1.

The wheel 3 of the wheel module 2 has a wheel rim 8 and a tire 9, wherein the tire 9 is arranged on the wheel rim 8. For example, the wheel rim 8 is formed as a steel, aluminum or plastic rim. For example, the tire 9 is formed as a rubber tire filled with air.

The wheel module 3 has a wheel axle 10 which defines a main axis H with its longitudinal axis. The wheel 3 is arranged with its axis of rotation coaxially to the wheel axle 10. The wheel axle 10 is fixed to the wheel fork 6, wherein the wheel rim 8 is rotatably mounted on the wheel axle 10 via two bearing devices, e.g., rolling bearings.

To drive the wheel 3, the wheel module 2 has a drive device 11, for example an electric motor, integrated into the wheel rim 8. The drive device 11 has a stator that is connected to the wheel axle 10 in a non-rotatable manner and is arranged between the two bearing devices in the axial direction with respect to the main axis H. In addition, the drive device 12 has a rotor that is connected to the wheel rim 8 in a non-rotatable manner. In driving operation of the vehicle 1, the wheel rim 8 is driven by the drive device 11, wherein the wheel 3 rotates about the main axis H.

The wheel module 2 has a brake apparatus 12, which is used to transmit a braking torque to the wheel 3. The brake apparatus 12 is formed as a friction brake and is arranged on one side of the wheel rim 8 and/or is operatively connected to the wheel rim 8.

The brake apparatus 12 has an annular brake pad, in particular extending around the main axis H, as a rotating brake partner and a brake disc 13 (FIG. 2) as a stationary brake partner, wherein the brake pad and the brake disc 13 are arranged coaxially to one another with respect to the main axis H. The brake pad is non-rotatable with respect to the main axis H on an axial end face of the wheel rim 8, so that the brake pad is carried along by the wheel rim 8 during driving operation and rotates about the main axis H. The brake disc 13 is movable in an axial direction AR towards the brake pad and in an axial opposite direction GR away from the brake pad. In the direction of rotation about the main axis H, the brake disc 13 is coupled to the wheel axle 10 or the wheel fork 6 in a non-rotatable manner.

In an actuated state of the brake apparatus 12, the brake disc 13 contacts the brake pad so that a frictional connection is formed to brake the rotating wheel 3 by friction between the brake disc 13 and the brake pad.

Figure 2:
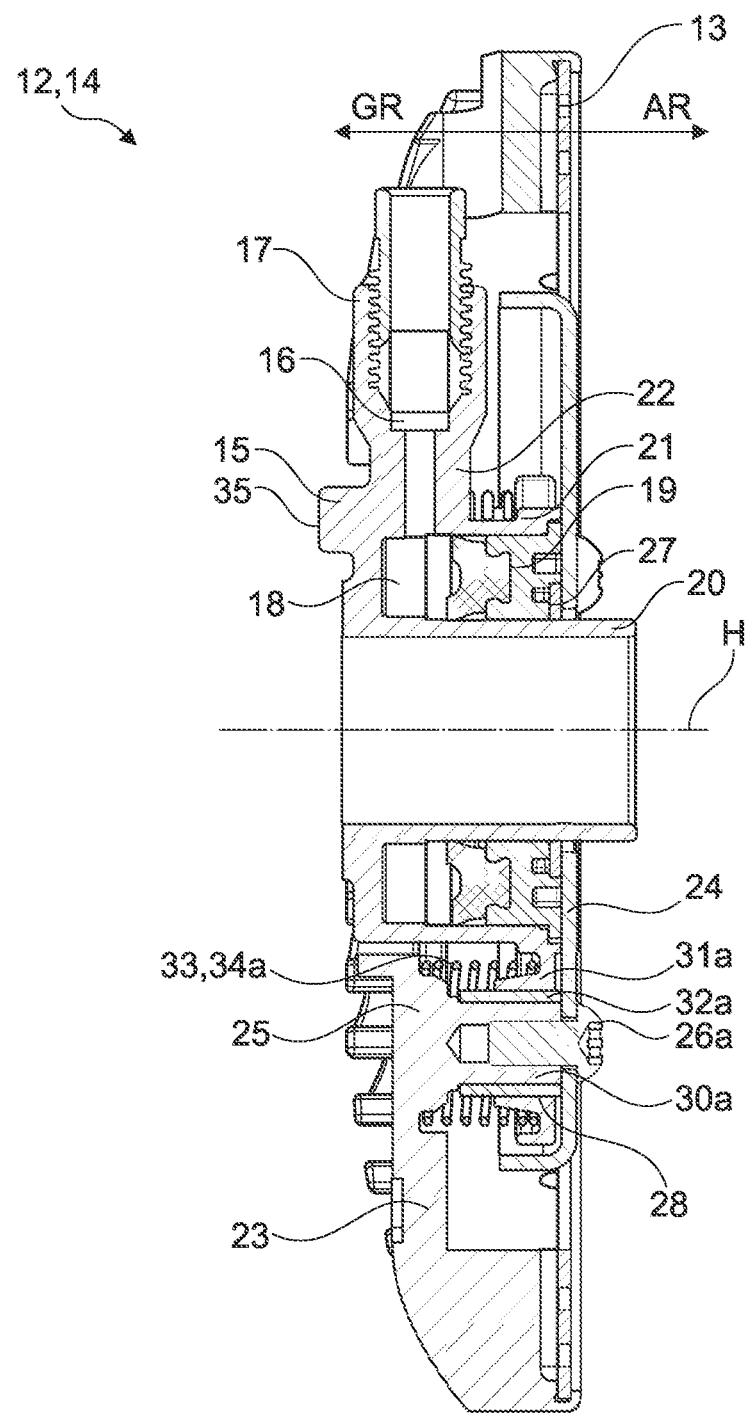
FIG. 2 shows a schematic sectional view of the brake unit of FIG. 1 as a further exemplary embodiment.

FIG. 2 shows a schematic longitudinal section through a brake unit 14, wherein the brake unit 14 forms the fork-fixed part of the brake apparatus 12, in particular the brake unit 14 carries the brake disc 13 and displaces it in axial direction AR and opposite direction GR.

The brake unit 14 has a housing 15, wherein the housing 15 is arranged coaxially to the main axis H and is arranged on the wheel fork 6 in a non-rotatable manner. The brake unit 14 has a hydraulic unit 16, wherein the hydraulic unit 16 is arranged, in particular integrated, in the housing 15.

The hydraulic unit 16 has a connection 17 through which hydraulic pressure can be applied to it. The connection 17 is fluidically connected to an annular space 18 as a pressure chamber, wherein the annular space 18 forms a cylinder of the hydraulic unit 16. The annular space 18 is arranged coaxially with the main axis H. An annular piston 19 is arranged in the annular space 18, wherein the annular piston 19 as a cylinder in the annular space 18 can be displaced hydraulically in the axial direction AR. The annular piston 19 is formed in two parts in the axial direction. The housing 15 has a receiving section 20 for receiving the wheel axle 10, wherein the receiving section 20 forms an inner wall of the annular space 18. Furthermore, the housing 15 has an outer wall 21, wherein the outer wall 21 delimits the annular space 18 radially on the outer side. The receiving section 20 and the outer wall 21 are formed as an integrated housing base body 22.

The brake unit 14 has a brake body device 23, wherein the brake body device 23 carries the brake disc 13 and is displaced together with the latter in the axial direction AR or in the axial opposite direction GR by the hydraulic unit 16. The brake body device 23 has a force distribution plate 24, wherein this is formed as a pot with a collar for stability reasons. In a radially inner region, the force distribution plate 24 rests on the annular piston 19 so that the force distribution plate 24 is carried along during an axial movement of the annular piston 19. The brake body device 23 has a brake base body 25, wherein the braking element body 25 supports the brake disc 13. The brake base body 25 is connected to the force distribution plate 24 via a first, a second and a third screw connection 26a, b, c, so that during axial movement the brake base body 25 and thus the brake disc 13 are carried along in the axial direction AR.

Figure 3:
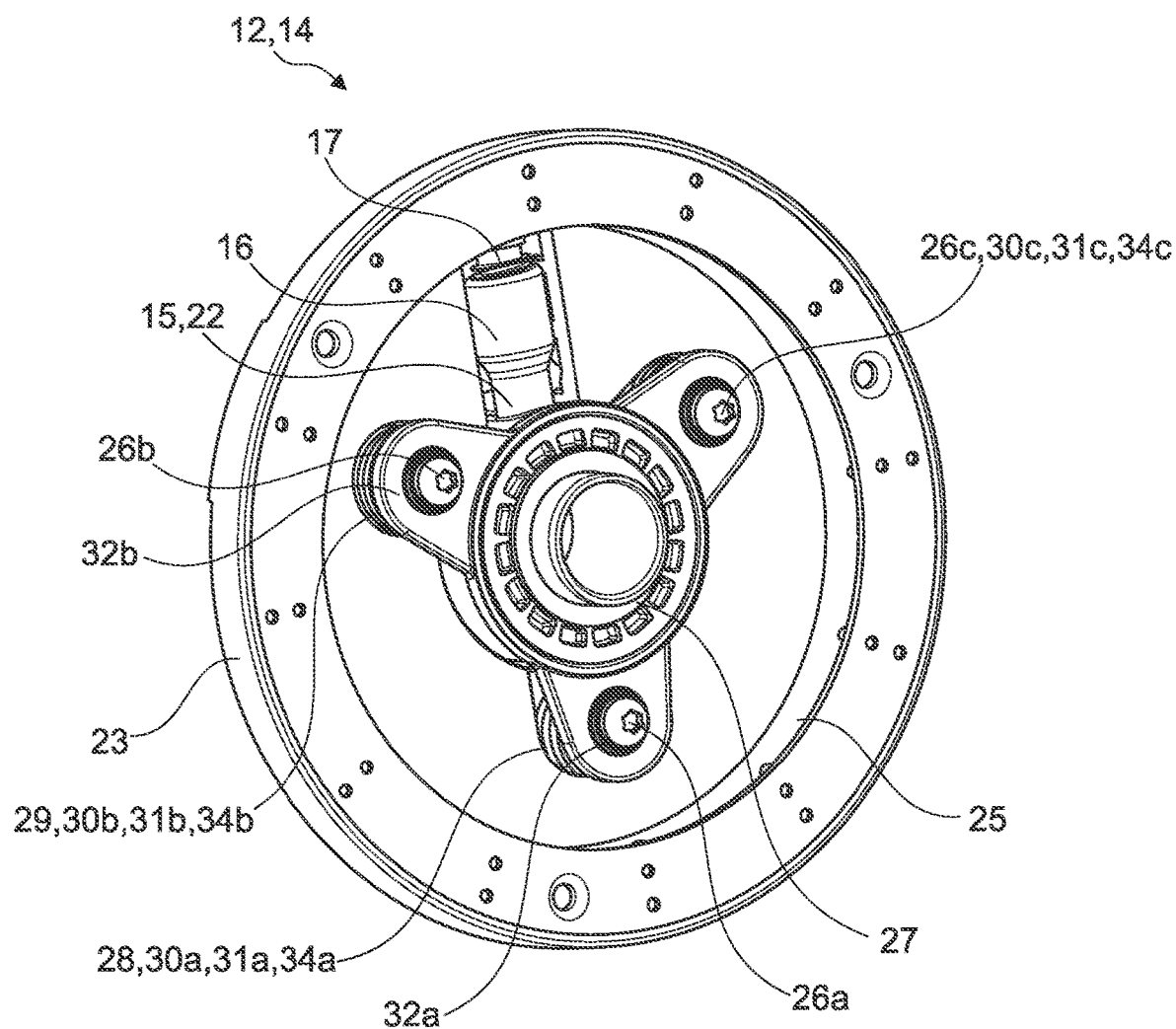
FIG. 3 shows a three-dimensional, schematic axial representation of the brake unit from FIG. 1.

FIG. 3 shows an axial plan view of the brake unit 14 in a three-dimensional representation. However, the force distribution plate 24 is omitted in the representation here so that the underlying components can be seen. Firstly, the annular piston 19 can be seen once again, wherein the annular piston 19 is protected against penetrating contamination by a seal 27. Secondly, the screw connections 26a, b, c can be seen, which are each offset from one another by 120°.

For guiding the brake base body 25 with the force distribution plate 24 and the annular piston 19 in the transverse direction to the axial direction AR, the brake unit 14 has a master guide 28 and an auxiliary guide 29. The master guide 28 and the auxiliary guide 29 are arranged coaxially to the screw connections 26a, b and/or also offset by 120°. There is no guide under the third screw connection 26c, but only a fixation between the force distribution plate 24 and the brake base body 25.

From a functional point of view, the radial clearance of the master guide 28 is smaller than that of the auxiliary guide 29. This design is supposed to help avoid over-definition. It is ensured in this way that the brake base body 25 and thus the brake disc 13 can be moved without jamming. A further technical effect of the master guide 28 or auxiliary guide 29 is that torques introduced during the braking process can be conducted about the main axis H from the brake disc 13 via the brake base body 25 to the housing 15. The radial clearance can optionally be measured locally with rotational symmetry on the respective guides 28 or 29; alternatively, the radial clearance is measured in the direction of rotation around the main axis H.

FIG. 2 shows a sectional view of the master guide 28, wherein the auxiliary guide 29 are formed with an identical design. The master guide 28 has a first axle section 30a, wherein the axle section 30a is integrally formed from the brake base body 25. A thread is provided on the radially inner side, in which a screw engages to form the screw connection 26a. The auxiliary guide 29 has a second axle section 30b, and the third screw connection 26c has a third axle section 30c, wherein the second and third axle sections 30b, c have the same structure as the first axle section 30a, so that reference is made to the description thereof.

The master guide 28 has a first guide section 31a, wherein the first guide section 31a receives the first axle section 30a. In particular, the first guide section 31a is arranged coaxially and concentrically to the first axle section 30a. The auxiliary guide 29 has a second guide section 31b, and the third screw connection 26c has a third guide section 31c, wherein the second and third guide sections 31b, c have the same structure as the first guide section 31a, so that reference is made to the description thereof.

The master guide 28 has a first guide sleeve 32a, wherein the first guide sleeve 32a is fitted to the first axle section 30a and provides a guide surface for the first guide section 31a. The auxiliary guide 29 has a second guide sleeve 32b, which is fitted onto the second axle section 30b and provides a second guide surface for the second guide section 31a. The third screw connection 26c does not have a guide sleeve so that the radial clearance can optionally be described as very large, in particular larger than the first and second radial clearances, or the third screw connection 26c does not implement any guide function.

In this way, the torques introduced about the main axis H from the brake disc 13 due to the braking process are subsequently introduced into the housing 15 via the brake base body 25 via the master guide 28 and the auxiliary guide 29. The housing 15 has a form-fit section 35 which engages in the wheel fork 6 so that the torque can be diverted into the wheel fork 6.

The brake unit 14 has a return unit 33, wherein the return unit 33 is formed by three return springs 34a, b, c. FIG. 2 shows the first return spring 34a, which is formed as a compression spring arranged coaxially with the master guide 18 and/or with the first axle section 30a and is compressed during an axial movement of the brake disc 13 in the axial direction AR. The second and third return springs 34b, c are arranged coaxially with the auxiliary guide 29 and coaxially with the second axle section 30b and coaxially with the third axle section 30c, respectively, and are also compressed during axial movement of the brake disc 13 in the axial direction AR.

As soon as the hydraulic pressure in the hydraulic unit 16 decreases, the brake disc 13 can be returned in the axial opposite direction GR by the spring force of the return springs 34a, b, c.

Figure 4:
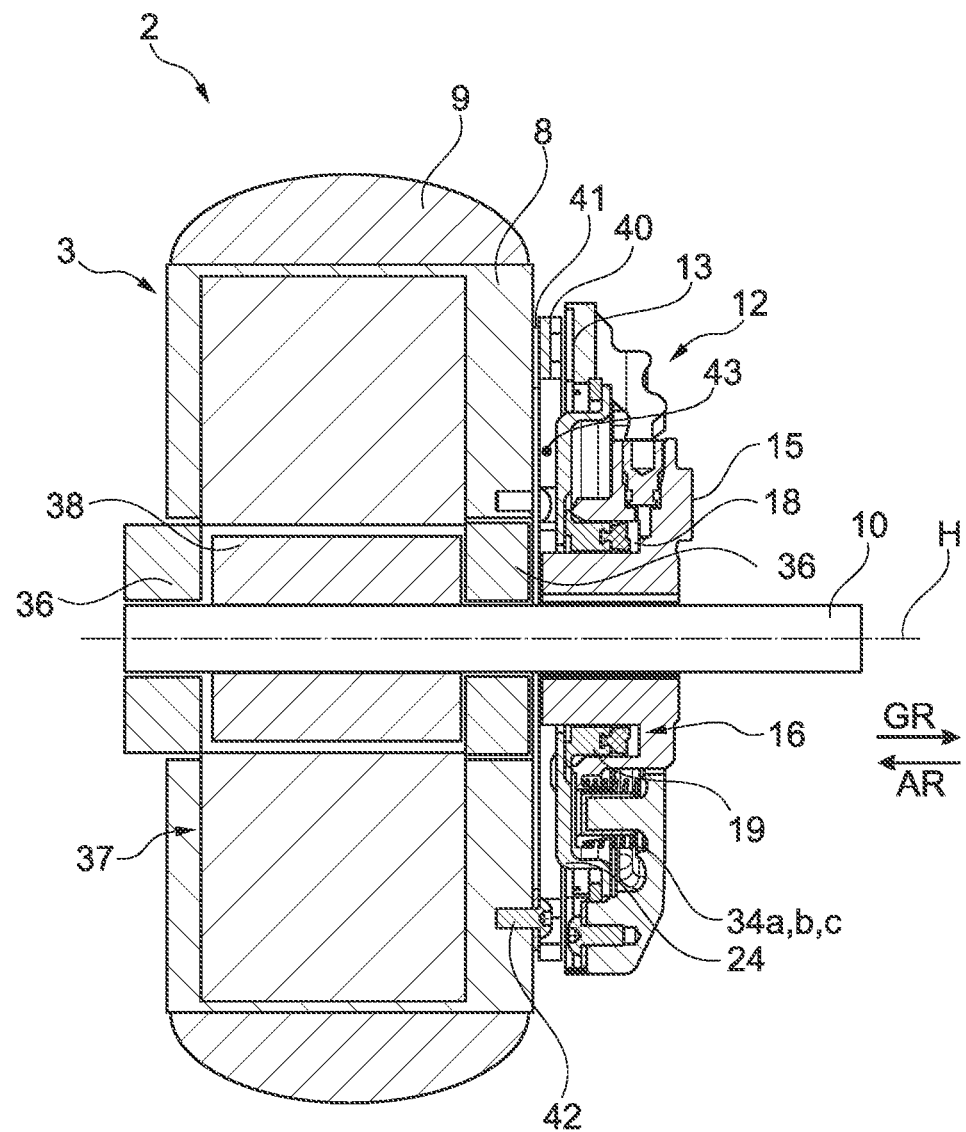
FIG. 4 shows a schematic sectional view of the wheel module of FIG. 1 as a further exemplary embodiment.

FIG. 4 shows a schematic sectional view of a wheel module 2, e.g., from FIG. 1 as a further exemplary embodiment. Similar or the same reference symbols designate similar or the same components as in the previous figures. In particular, reference is made to the preceding description for these components.

The wheel module 3 has the wheel axle 10, which defines an axis of rotation D with its longitudinal axis. The wheel 3 is arranged coaxially to the axis of rotation D on the wheel axle 10. The wheel axle 10 is fixed to the wheel fork 6, wherein the wheel rim 8 is rotatably mounted on the wheel axle 10 via two bearing devices 36, e.g., rolling bearings.

To drive the wheel 3, the wheel module 2 has a drive device 37, for example an electric motor, integrated into the wheel rim 8. The drive device 37 has a stator 38 connected to the wheel axle 10 in a non-rotatable manner, which is arranged between the two bearing devices 36 in the axial direction with respect to the axis of rotation D. In addition, the drive device 37 has a rotor 39 that is connected to the wheel rim 8 in a non-rotatable manner. In driving operation of the vehicle 1, a driving torque is generated between the stator 38 and the rotor 39 so that the wheel rim 8 is driven by the drive device 37 and the wheel 3 rotates around the main axis H.

The brake apparatus 12 has an annular brake pad 40, in particular rotating around the main axis H, as a rotating brake partner and the brake disc 13, wherein the brake pad 40 and the brake disc 13 are arranged coaxially to one another with respect to the main axis H. The brake pad 40 is non-rotatable with respect to the main axis H on an axial end face of the wheel rim 8, so that the brake pad 40 is carried along by the wheel rim 8 during driving operation and rotates about the main axis H. The brake disc 13 is movable in the axial direction AR towards the brake pad 40 and in the axial opposite direction GR away from the brake pad 40. In the direction of rotation about the main axis H, the brake disc 13 is coupled to the wheel axle 10 in a non-rotatable manner.

The brake apparatus 12 has a brake pad carrier 41, which carries the brake pad 40 on the wheel rim 8. For example, the brake pad 40 is materially bonded to the brake pad carrier 41. The brake pad carrier 41 is annular in shape, e.g., formed as a sheet metal ring, and is fastened to the wheel rim 2 by fastening means 42, in particular by a plurality of screws. The brake pad carrier 41 is arranged on the wheel rim 8 in such a way that it is coaxial and/or concentric with the wheel rim 8.

In an actuated state of the brake apparatus 12, the brake disc 13 contacts the brake pad 40 so that the braking torque is formed by a frictional connection to brake the rotating wheel 3 by friction between the brake disc 13 and the brake pad 40. During heavy braking, high temperatures develop, especially at the brake pad 40, which can lead to overheating of the drive device 37. In addition, the service life may decrease as the materials in the drive device 37 age more quickly at high temperatures.

In this regard, it is provided that the brake pad 40 and/or the brake pad carrier 41 are formed as a thermal insulator to insulate the wheel rim 8, and thus the drive device 37, from incident heat generated by brake friction. For this purpose, the brake pad 40 may, for example, comprise a friction means made of an organic material, such as glass, rubber or carbon fibers.

Because the brake pad 40 and/or the brake pad carrier 41 is/are arranged on the wheel rim 8, the brake apparatus 12 can advantageously be formed to be particularly space-saving and particularly slim and narrow. Moreover, due to the concentric design of the brake apparatus 12, the brake apparatus 12 can be adapted in a simple manner to a size of the wheel 3, in particular to a size of the wheel rim 8.

Between the wheel rim 8 or the drive device 11 and the brake body device 23, there is an interior 43 that is arranged radially inside the brake disc 13 and/or the brake pad 40. In order to avoid a build-up of heat in this area, an axial opening 44 (see FIG. 5) can be provided for an exchange of air.

Figure 5:
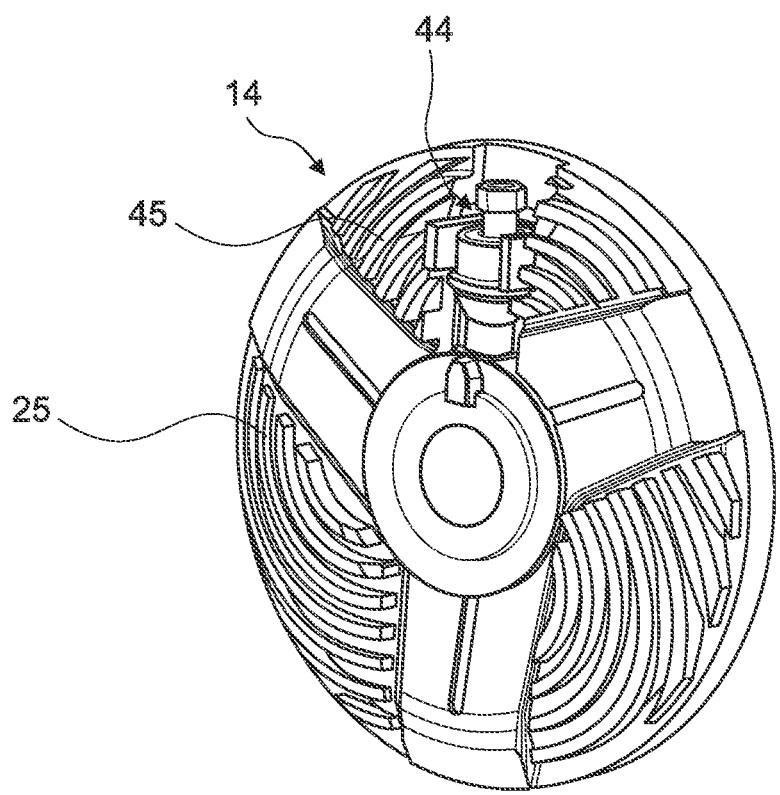
FIG. 5 shows a three-dimensional plan view of the brake unit of the preceding figures.

FIG. 5 shows a schematic three-dimensional view of the brake unit 14, wherein the axial opening 44 is visible. It can also be seen that cooling structures 45 in the form of cooling fins are integrally introduced into the brake base body 25 on the axial outer side, so that the surface of the brake base body 25 is enlarged and heat absorbed by the brake disc 13 or due to a heat accumulation in the interior 43 can be dissipated into the environment via heat conduction.

LIST OF REFERENCE MARKINGS

1 Vehicle
2 Wheel module
3 Wheel
4 Rear wheel
5 Vehicle frame
6 Wheel fork
7 Handlebar 8 Wheel rim
9 Tires
10 Wheel axle
11 Drive device
12 Brake apparatus
13 Brake disc
14 Brake unit
15 Housing
16 Hydraulic unit
17 Connection
18 Annular space
19 Annular piston
20 Receiving section
21 Outer wall
22 Housing base body
23 Brake body device
24 Force distribution plate
25 Brake base body
26a, b, c Screw connections
27 Seal
28 Master guide
29 Auxiliary guide
30a, b, c Axle sections
31a, b, c Guide section
32a, b Guide sleeve
33 Return means
34a,b,c Return springs
35 Form-fit section
36 Bearing devices
37 Drive device
38 Stator
39 Rotor
40 Brake pad
41 Brake pad carrier
42 Screws
43 Interior
44 Axial opening
45 Cooling structures

The invention claimed is:

1. A brake unit for a vehicle, the brake unit comprising:
a housing;
a brake body device that supports a stationary brake partner of a brake apparatus for the vehicle, the brake body device being disposed at least partially radially outward of the housing;
at least one of the housing or the brake body device defining a main axis;
an actuator for moving the brake body device relative to the housing in order to generate a braking force, wherein the actuator is configured for axial movement of the brake body device; and
the stationary brake partner is formed as a brake disc.

2. The brake unit according to claim 1, wherein the brake disc is formed from metal or ceramic.

3. The brake unit according to claim 1, wherein the brake disc provides a braking surface, the braking surface is formed as at least one of a circular ring surface or extends continuously in a direction of rotation to the main axis.

4. The brake unit according to claim 1, wherein the actuator comprises a hydraulic unit, the hydraulic unit has an annular space and an annular piston, and the annular space and the annular piston are formed circumferentially to the main axis.

5. A wheel module for a vehicle, the wheel module comprising the brake unit according to claim 1.

6. The wheel module according to claim 5, further comprising a wheel, and a rotating brake partner is non-rotatably connected to the wheel.

7. The wheel module according to claim 6, wherein the rotating brake partner is formed as a brake pad.

8. The wheel module according to claim 6, further comprising a drive device arranged in the wheel.

9. A vehicle comprising the brake unit according to claim 1, wherein the vehicle comprises an electric motorcycle or an electric scooter.

10. The wheel module according to claim 8, wherein the drive device is arranged in a wheel rim of the wheel.

11. A brake unit for a vehicle, the brake unit comprising:
a housing;
a brake body that supports a stationary brake partner comprising a brake disc;
at least one of the housing or the brake body defining a main axis;
an actuator for moving the brake body relative to the housing in order to generate a braking force; and
a rotating brake partner configured to be non-rotatably connected to a wheel of the vehicle;
wherein a cylindrically-shaped receiving section of the housing extends axially through the brake body such that the receiving section is axially aligned with the main axis, and the receiving section is configured for receiving a wheel axle of the wheel.

12. The brake unit according to claim 11, wherein the brake disc is formed from metal or ceramic.

13. The brake unit according to claim 11, wherein the brake disc provides a braking surface, the braking surface is formed as at least one of a circular ring surface or extends continuously in a direction of rotation to the main axis.

14. The brake unit according to claim 11, wherein the actuator is configured for axial movement of the brake body.

15. The brake unit according to claim 14, wherein the actuator comprises a hydraulic unit, the hydraulic unit has an annular space and an annular piston, and the annular space and the annular piston are formed circumferentially about the main axis.

16. The brake unit according to claim 15, wherein the receiving section forms an inner wall of the annular space and an outer wall of the housing delimits the annular space radially on the outer side.

17. A wheel module for a vehicle, the wheel module comprising:
a wheel;
a drive device arranged in the wheel, the drive device being an electric motor;
a rotating brake partner non-rotatably connected to the wheel; and
a brake unit comprising:
a housing;
a brake body device that supports a stationary brake partner of a brake apparatus for the vehicle;
at least one of the housing or the brake body device defining a main axis;
an actuator for moving the brake body device relative to the housing in order to generate a braking force; and
the stationary brake partner is formed as a brake disc.

18. The brake unit according to claim 1, wherein the actuator is integrated into the housing.

19. The brake unit according to claim 11, wherein the actuator is integrated into the housing.

* * * * *